United States Patent
Norrell et al.

(10) Patent No.: US 7,813,439 B2
(45) Date of Patent: Oct. 12, 2010

(54) VARIOUS METHODS AND APPARATUSES FOR IMPULSE NOISE DETECTION

(75) Inventors: Andy Norrell, Nevada City, CA (US); Scott A. Lery, Nevada City, CA (US); Philip Desjardins, Nevada City, CA (US); Mike Behrin, Nevada City, CA (US)

(73) Assignee: Broadcom Corporation, Irvine, CA (US)

(*) Notice: Subject to any disclaimer, the term of this patent is extended or adjusted under 35 U.S.C. 154(b) by 994 days.

(21) Appl. No.: 11/348,733

(22) Filed: Feb. 6, 2006

(65) Prior Publication Data

US 2007/0183526 A1 Aug. 9, 2007

(51) Int. Cl.
H04L 23/02 (2006.01)
(52) U.S. Cl. .................................... 375/265
(58) Field of Classification Search ................. 375/260, 375/262, 265, 340–341, 346; 714/786, 788, 714/792, 795, 701, 752; 370/335, 342
See application file for complete search history.

(56) References Cited

U.S. PATENT DOCUMENTS

| | | | |
|---|---|---|---|
| 4,024,359 A | 5/1977 | De Marco et al. | |
| 4,024,360 A | 5/1977 | Biraghi et al. | |
| 4,173,714 A | 11/1979 | Bloch et al. | |
| 4,384,355 A | 5/1983 | Werner | |
| 4,679,227 A | 7/1987 | Hughes-Hartogs | |
| 4,733,389 A | 3/1988 | Puvogel | |
| 4,845,466 A | 7/1989 | Hariton et al. | |
| 4,882,733 A * | 11/1989 | Tanner | ....................... 714/752 |
| 4,977,591 A | 12/1990 | Chen et al. | |
| 5,285,474 A | 2/1994 | Chow et al. | |
| 5,304,940 A | 4/1994 | Harasawa et al. | |
| 5,483,551 A | 1/1996 | Huang et al. | |
| 5,524,125 A | 6/1996 | Tsujimoto | |
| 5,555,274 A | 9/1996 | Sheets | |
| 5,559,890 A | 9/1996 | Obermeier et al. | |
| 5,596,258 A * | 1/1997 | Kimura et al. | .............. 320/163 |
| 5,596,439 A | 1/1997 | Dankberg et al. | |

(Continued)

FOREIGN PATENT DOCUMENTS

EP 0 377 965 7/1989

(Continued)

OTHER PUBLICATIONS

Thomas Starr, John M. Cioffi, Peter J. Silverman, Understanding Digital Subscriber Line Technology, 1999, pp. 94-97, 147-154, 206-217, 241-251, 330-331, Cover Page, Publication Page, Table of Contents. Prentice Hall PTR Upper Saddle River, NJ, 07458.

(Continued)

*Primary Examiner*—Khanh C Tran
(74) *Attorney, Agent, or Firm*—Sterne, Kessler, Goldstein & Fox P.L.L.C.

(57) ABSTRACT

Methods and apparatuses for reducing effects of impulse noise in a DSL transmitter receiver device are described. According to certain embodiment, the method includes comparing a hard decision output of a decoder with a soft decision output for a convolution coded modulation symbol received at a digital subscriber line (DSL) receiver. The presence of impulse noise is detected based on a lack of agreement between the hard decision output and the soft decision output.

18 Claims, 5 Drawing Sheets

U.S. PATENT DOCUMENTS

| | | |
|---|---|---|
| 5,627,859 A | 5/1997 | Parr |
| 5,703,904 A | 12/1997 | Langberg |
| 5,768,473 A | 6/1998 | Eatwell et al. |
| 5,815,538 A | 9/1998 | Grell et al. |
| 5,818,872 A | 10/1998 | Gupta |
| 5,844,940 A | 12/1998 | Goodson et al. |
| 5,852,630 A | 12/1998 | Langberg et al. |
| 5,867,539 A * | 2/1999 | Koslov ............... 375/346 |
| 5,901,205 A | 5/1999 | Smith et al. |
| 5,909,178 A | 6/1999 | Balch et al. |
| 5,930,268 A | 7/1999 | Kurby et al. |
| 5,952,914 A | 9/1999 | Wynn |
| 5,974,098 A | 10/1999 | Tsuda |
| 5,978,373 A | 11/1999 | Hoff et al. |
| 6,006,083 A | 12/1999 | Tong et al. |
| 6,014,376 A | 1/2000 | Abreu et al. |
| 6,052,420 A | 4/2000 | Yeap et al. |
| 6,118,769 A | 9/2000 | Pries et al. |
| 6,147,963 A | 11/2000 | Walker et al. |
| 6,161,209 A | 12/2000 | Moher |
| 6,185,429 B1 | 2/2001 | Gehrke et al. |
| 6,205,220 B1 | 3/2001 | Jacobsen et al. |
| 6,205,410 B1 | 3/2001 | Cai |
| 6,212,227 B1 | 4/2001 | Ko et al. |
| 6,226,322 B1 | 5/2001 | Mukherjee |
| 6,256,326 B1 | 7/2001 | Kudo |
| 6,266,347 B1 | 7/2001 | Amrany et al. |
| 6,266,422 B1 | 7/2001 | Ikeda |
| 6,295,323 B1 | 9/2001 | Gabara |
| 6,345,071 B1 | 2/2002 | Hamdi |
| 6,351,509 B1 | 2/2002 | Vitenberg et al. |
| 6,359,926 B1 | 3/2002 | Isaksson |
| 6,363,109 B1 | 3/2002 | Polley et al. |
| 6,378,234 B1 | 4/2002 | Luo |
| 6,411,657 B1 | 6/2002 | Verbin et al. |
| 6,433,819 B1 | 8/2002 | Li et al. |
| 6,445,773 B1 | 9/2002 | Liang et al. |
| 6,456,673 B1 | 9/2002 | Wiese et al. |
| 6,459,739 B1 | 10/2002 | Vitenberg |
| 6,466,588 B1 | 10/2002 | Michaels |
| 6,493,395 B1 | 12/2002 | Isaksson et al. |
| 6,498,808 B1 | 12/2002 | Tzannes |
| 6,507,608 B1 | 1/2003 | Norrell |
| 6,519,291 B1 | 2/2003 | Dagdeviren et al. |
| 6,542,028 B1 | 4/2003 | Norrell et al. |
| 6,546,025 B1 | 4/2003 | Dupuy |
| 6,556,635 B1 | 4/2003 | Dehghan |
| 6,597,732 B1 | 7/2003 | Dowling |
| 6,621,346 B1 | 9/2003 | Nabicht et al. |
| 6,631,175 B2 | 10/2003 | Harikumar et al. |
| 6,633,545 B1 | 10/2003 | Milbrandt |
| 6,674,795 B1 | 1/2004 | Liu et al. |
| 6,690,666 B1 | 2/2004 | Norrell et al. |
| 6,721,394 B1 | 4/2004 | Murphy et al. |
| 6,731,914 B2 | 5/2004 | Creigh et al. |
| 6,738,418 B1 | 5/2004 | Stiscia et al. |
| 6,754,170 B1 | 6/2004 | Ward |
| 6,763,061 B1 | 7/2004 | Strait et al. |
| 6,775,241 B1 | 8/2004 | Levin |
| 6,791,995 B1 | 9/2004 | Azenkot et al. |
| 6,798,735 B1 | 9/2004 | Tzannes et al. |
| 6,822,998 B1 | 11/2004 | Yun et al. |
| 6,826,404 B2 | 11/2004 | Delfs et al. |
| 6,839,429 B1 | 1/2005 | Gaikwad et al. |
| 6,859,488 B2 | 2/2005 | Azenkot et al. |
| 6,871,066 B1 | 3/2005 | Khullar et al. |
| 6,898,236 B1 | 5/2005 | Sun |
| 6,940,973 B1 | 9/2005 | Yeap et al. |
| 6,965,636 B1 | 11/2005 | DesJardins et al. |
| 6,999,504 B1 | 2/2006 | Amrany et al. |
| 6,999,507 B2 | 2/2006 | Jin |
| 7,023,910 B1 | 4/2006 | Norrell |
| 7,031,669 B2 | 4/2006 | Vaidyanathan et al. |
| 7,035,661 B1 | 4/2006 | Yun |
| 7,085,315 B1 | 8/2006 | Kelton |
| 7,085,539 B2 | 8/2006 | Furman |
| 7,120,211 B2 | 10/2006 | Shmulyian et al. |
| 7,155,007 B1 | 12/2006 | Upton |
| 7,174,022 B1 | 2/2007 | Zhang et al. |
| 7,177,419 B1 | 2/2007 | Sedarat et al. |
| 7,184,467 B2 | 2/2007 | Jacobsen et al. |
| 7,200,196 B2 | 4/2007 | Li et al. |
| 7,215,727 B2 | 5/2007 | Yousef et al. |
| 7,221,722 B2 | 5/2007 | Thomas et al. |
| 7,283,509 B2 | 10/2007 | Moon et al. |
| 7,302,379 B2 | 11/2007 | Cioffi et al. |
| 7,315,592 B2 | 1/2008 | Tsatsanis et al. |
| 7,315,967 B2 | 1/2008 | Azenko et al. |
| 7,330,544 B2 | 2/2008 | D'Angelo et al. |
| 7,356,049 B1 | 4/2008 | Rezvani |
| 7,366,258 B2 * | 4/2008 | Kolze et al. ............... 375/340 |
| 7,369,607 B2 | 5/2008 | Sedarat |
| 7,421,015 B2 | 9/2008 | Sedarat |
| 7,433,395 B2 | 10/2008 | Sedarat |
| 7,443,916 B2 | 10/2008 | Sedarat et al. |
| 7,502,336 B2 | 5/2009 | Romano et al. |
| 7,529,984 B2 * | 5/2009 | Heise ............... 714/701 |
| 7,555,037 B2 | 6/2009 | Sedarat |
| 2001/0009850 A1 | 7/2001 | Kushige |
| 2001/0011019 A1 | 8/2001 | Jokimies |
| 2001/0055332 A1 | 12/2001 | Sadjadpour et al. |
| 2002/0001340 A1 | 1/2002 | Shenoi et al. |
| 2002/0044597 A1 | 4/2002 | Shively et al. |
| 2002/0057713 A1 | 5/2002 | Bagchi et al. |
| 2002/0078247 A1 | 6/2002 | Lu et al. |
| 2002/0122515 A1 | 9/2002 | Bodenschatz |
| 2002/0154620 A1 | 10/2002 | Azenkot et al. |
| 2002/0163959 A1 | 11/2002 | Haddad |
| 2003/0021240 A1 | 1/2003 | Moon et al. |
| 2003/0035469 A1 | 2/2003 | Frank et al. |
| 2003/0043925 A1 | 3/2003 | Stopler et al. |
| 2003/0048368 A1 | 3/2003 | Bosco et al. |
| 2003/0055996 A1 | 3/2003 | Mori et al. |
| 2003/0091053 A1 | 5/2003 | Tzannes et al. |
| 2003/0099285 A1 | 5/2003 | Graziano et al. |
| 2003/0099286 A1 | 5/2003 | Graziano et al. |
| 2003/0099350 A1 | 5/2003 | Bostoen et al. |
| 2003/0108094 A1 | 6/2003 | Lai et al. |
| 2003/0112860 A1 | 6/2003 | Erdogan |
| 2003/0124983 A1 | 7/2003 | Parssinen et al. |
| 2003/0185176 A1 * | 10/2003 | Lusky et al. ............... 370/335 |
| 2003/0206579 A1 | 11/2003 | Bryant |
| 2003/0227967 A1 | 12/2003 | Wang et al. |
| 2004/0057502 A1 | 3/2004 | Azenkot et al. |
| 2004/0066865 A1 | 4/2004 | Yousef et al. |
| 2004/0071240 A1 | 4/2004 | Betts |
| 2004/0087278 A1 | 5/2004 | Lin et al. |
| 2004/0091025 A1 | 5/2004 | Sindhushayana et al. |
| 2004/0111345 A1 | 6/2004 | Chuang et al. |
| 2004/0141548 A1 | 7/2004 | Shattil |
| 2004/0156441 A1 | 8/2004 | Peeters et al. |
| 2004/0176063 A1 | 9/2004 | Choi |
| 2004/0185852 A1 | 9/2004 | Son et al. |
| 2004/0213170 A1 | 10/2004 | Bremer |
| 2004/0223449 A1 | 11/2004 | Tsuie et al. |
| 2005/0041753 A1 | 2/2005 | Cunningham |
| 2005/0047489 A1 | 3/2005 | Yousef et al. |
| 2005/0047514 A1 | 3/2005 | Bolinth et al. |
| 2005/0053229 A1 | 3/2005 | Tsatsanis et al. |
| 2005/0094550 A1 | 5/2005 | Huh et al. |
| 2005/0099967 A1 | 5/2005 | Baba |
| 2005/0111561 A1 | 5/2005 | Sedarat et al. |
| 2005/0143008 A1 | 6/2005 | Bailey |
| 2005/0159128 A1 | 7/2005 | Collins et al. |

| | | | |
|---|---|---|---|
| 2005/0169357 A1 | 8/2005 | Sedarat | |
| 2005/0190825 A1 | 9/2005 | Sedarat | |
| 2005/0190848 A1* | 9/2005 | Kiyanagii et al. | 375/260 |
| 2005/0190871 A1 | 9/2005 | Sedarat | |
| 2005/0216441 A1 | 9/2005 | Thomas et al. | |
| 2005/0271129 A1 | 12/2005 | Reina | |
| 2005/0276355 A1 | 12/2005 | Chow et al. | |
| 2006/0002457 A1 | 1/2006 | Romano et al. | |
| 2006/0019687 A1 | 1/2006 | Garg et al. | |
| 2006/0039550 A1 | 2/2006 | Chadha et al. | |
| 2006/0062379 A1 | 3/2006 | Sedarat et al. | |
| 2006/0067388 A1 | 3/2006 | Sedarat et al. | |
| 2006/0078044 A1* | 4/2006 | Norrell et al. | 375/222 |
| 2006/0083321 A1 | 4/2006 | Sedarat | |
| 2006/0083322 A1 | 4/2006 | DesJardins et al. | |
| 2006/0083323 A1 | 4/2006 | DesJardins et al. | |
| 2006/0083324 A1* | 4/2006 | DesJardins et al. | 375/260 |
| 2006/0115030 A1 | 6/2006 | Erving et al. | |
| 2006/0126747 A1 | 6/2006 | Wiese | |
| 2006/0171480 A1 | 8/2006 | Erving et al. | |
| 2006/0193390 A1 | 8/2006 | Sedarat | |
| 2006/0203843 A1 | 9/2006 | Liu | |
| 2006/0227913 A1 | 10/2006 | Sedarat | |
| 2006/0291537 A1 | 12/2006 | Fullerton et al. | |
| 2007/0002940 A1* | 1/2007 | Zhou | 375/222 |
| 2007/0217492 A1 | 9/2007 | Cox et al. | |

FOREIGN PATENT DOCUMENTS

| | | |
|---|---|---|
| EP | 0844758 A2 | 5/1998 |
| EP | 0 966 134 A2 | 12/1999 |
| EP | 1 389 846 A2 | 2/2004 |
| EP | 1388944 A1 | 2/2004 |
| EP | 1389846 A | 2/2004 |
| WO | WO 2006/042274 A1 | 4/2006 |

OTHER PUBLICATIONS

International Preliminary Report on Patentability, PCT/US2007/001997 filed Jan. 25, 2007, mailed Aug. 21, 2008.
U.S. Appl. No. 10/956,201, filed Sep. 30, 2004, Hossein Sedarat.
U.S. Appl. No. 11/248,704, filed Oct. 11, 2005, Norrell et al.
U.S. Appl. No. 11/377,114, filed Mar. 15, 2006, Hossein Sedarat.
U.S. Appl. No. 11/377,084, filed Mar. 15, 2006, Sedarat et al.
PCT International Search Report and Written Opinion of the International Searching Authority from the International Searching Authority, mailed Jul. 18, 2007, International Application No. PCT/US2007/001997, International filing date Jan. 25, 2007, 10 pages.
D. Toumpakaris, Wei Yu, J. M.Cioffi, D. Gardan, M. Ouzzif, "A byte-erasure method for improved impulse immunity in DSL systems using soft information from an inner code", *IEEE International Conference on Communications (ICC)*, vol. 4, pp. 2431-2435, May 2003.
D. Toumpakaris, J. M. Cioffi, D. Gardan, "Reduced Delay Protection of DSL Systems Against Nonstationary Disturbances", *IEEE Trans. Communications*, vol. 52, No. 11, Nov. 2004.
D. Toumpakaris, J. M.Cioffi, D. Gardan, M. Ouzzif, "A Square Distance-Based Byte-Erasure Method for Reduced-delay Protection of DSL Systems from Non-stationary Interference", *IEEE International Conference on Communications (ICC)*, vol. 4, pp. 2114-2119, San Francisco, CA, Dec. 2003.
D. Toumpakaris et al., "A byte-erasure method for improved impulse immunity in DSL systems using soft information from an inner code", ICC 2003, 2003 IEEE International Conference on Communications, Anchorage, Alaska, May 11-15, 2003, IEEE International Conference on Communications, New York, NY, IEEE, US, vol. 1 of 5, May 11, 2003, pp. 2431-2435, XP010642883, ISBN: 0-7803-7802-4.
T. N. Zogakis et al., "Impulse noise mitigation strategies for multicarrier modulation", Proceedings of the International Conference on Communications (ICC). Geneva, May 23-26, 1993, New York, IEEE, US, vol. 3, May 23, 1993, pp. 784-788, XP010137084, ISBN: 0-7803-0950-2.
D. Toumpakaris et al., "A square distance-based byte-erasure method for reduced-delay protection of DSL systems from non-stationary interference", Globecom '03, 2003—IEEE Global Telecommunications Conference, Conference Proceedings, San Francisco, Dec. 1-5, 2003, IEEE Global Telecommunications Conference, New York, NY: IEEE, US, vol. 7 of 7, Dec. 1, 2003, pp. 2114-2119, XP010677730, ISBN: 0-7803-7974-8.
A symmetric digital subscriber line transceivers 2 (ADSL2), Series G: Transmission Systems and Media, Digital Systems and Networks, Digital sections and digital line system—Access networks, ITU-T Recommendation G.992.3, Jul. 2002.
A symmetric digital subscriber line (ADSL) transceivers, Series G: Transmission Systems and Media, Digital Systemsa ND Networks, Digital transmission systems—Digital sections and digital line system—Access networks, ITU-T Recommendation G.992.1, Jun. 1999.
Splitterless asymmetric digital subscriber line (ADSL) transceivers, Series G: Transmission Systems and Media, Digital Systems and Networks, Digital transmission systems—Digital sections and digital line system— Access networks, ITU-T Recommendation G.992. 2, Jun. 1999.
Very high speed digital subscriber line, Series G; Transmission systems and media, digital systems and networks, Digital sections and digital line system—Access networks, ITU-T Recommendation G.993.1, Jun. 2004.
Richard E. Blahut, Theory and Practice of Error Control Codes, Chapter 7: Bose-Chaudhuri-Hocquenghem Codes, 1984, ISBN 0-201-10102-5.
Richard E. Blahut, Theory and Practice of Error Control Codes, Chapter 11: Fast Algorithms, 1984, ISBN 0-201-10102-5.
Ahmed, Nadeem, et al., "Optimal Transmit Spectra for Communication in the Presence of Crosstalk and Imperfect Echo Cancellation," IEEE, p. 17-21, © 2001.
Al-Dhahir, Naofal, et al., "Optimum Finite-Length Equalization for Multicarrier Transceivers," IEEE vol. 44, No. 1, p. 56-64, Jan. 1996.
Armada, Ana Garcia, et al., "Mulit-User Constant-Energy Bit Loading for M-PSK-Modulated Orthogonal Frequency Division Multiplexing," IEEE, p. 526-530, © 2002.
Arslan, G., et al., "Equalization for Discrete Multitone Transceivers to Maximize Bit Rate," IEEE, vol. 49, No. 12, p. 3123-3135, Dec. 2001.
Baccarelli, Enzo, et al., Novel Efficient Bit-Loading Algorithms for Peak-Energy Limited ADSL-Type Multicarrier Systems, IEEE Trans on Signal Processing, vol. 50, No. 5, May 2002.
Barreto, Andre Noll, et al., "Adaptive Bit Loading for Wireless OFDM Systems," IEEE International Symposium on Personal, Indoor, and Mobile Radio Communications, Oct. 2001.
Bingham, John A.C., et al., "Multicarrier Modulation for Data Transmission: An Idea Whose Time Has Come," IEEE, p. 5-14, May 1990.
Campello, Jorge, "Optimal Discrete Bit Loading for Multicarrier Modulation Systems," IEEE International Symposium on Information Theory, Cambridge, MA, Aug. 1998.
Chow, Peter S., et al., "A Practical Discrete Multitone Transceiver Loading Algorithm for Data Transmission Over Spectrally Shaped Channels," IEEE Trans. On Communications, vol. 43, No. 2, 1995.
Cioffi, J. et al., "Analog RF Cancelation with SDMT (96-084)," T1E1.4/96-084 contribution, Amati Communications Corporation, Apr. 22, 1996.
Cioffi, J.M. et al., "Generalized Decision-Feedback Equalization for Packet Transmission with ISI and Gaussian Noise." In Communications, Computation, Control, and Signal Processing, a tribute to Thomas Kailath, Kluwer Academic Publishers, pp. 79-127, 1997.
Communication pursuant to Article 94(3), EPC, 05806662.2-1525, Ref. W3477002EPPWOSv, 4 pages, dated Feb. 26, 2008.
Communication pursuant to Rules 109 and 110 EPC, 05806662.2-1525, PCT/US2005/036655, W3477002EPPWOSv, 2 pages, dated May 21, 2007.
"Draft Standard," Network and Customer Installation Interfaces-Asymmetric Digital Subscriber Line (ADSL) Metallic Interface, Draft American National Standard for Telecommunications, Alliance for Telecommunications Industry Solutions, T1. 413, 1998.
Farhang-Boroujeny, Behrouz, et al., "Design Methods for Time-Domain Equalizers in DMT Transceivers," IEEE, vol. 49, No. 3, pp. 554-562, Mar. 2001.

Fischer, Robert F.H., et al., "A New Loading Algorithm for Discrete Multitone Transmission," IEEE, pp. 724-728, 1996.
Franklin, Curt, "How DSL Works," How Stuff Works, http://computer.howstuffworks.com/dsl.htm/printable, printed Nov. 16, 2004.
Henkel, Werner, et al., "Maximizing the Channel Capacity of Multicarrier Transmission by Suitable Adaptation of the Time-Domain Equalizer," IEEE, vol. 48, No. 12, Dec. 2000.
PCT International Preliminary Report on Patentability and PCT Written Opinion of the International Searching Authority, PCT/US2005/023634 filed Jun. 30, 2005, report issued Jan. 9, 2007, 4 pages.
PCT International Preliminary Report on Patentability and PCT Written Opinion of the International Searching Authority, PCT/US2005/036655, filed Oct. 11, 2005, report issued Apr. 11, 2007, 6 pages.
Kamkar-Parsi et al., Wideband Crosstalk Interface Cancelling on xDSL Using Adaptive Signal Processing and Common Mode Signal, IEEE, 2004, pp. IV-1045 - IV-1048.
Karp et al., Zero-forcing frequency domain equalization for DMT systems with insufficient guard interval, IEEE ICASSP, 2003, pp. 221-224.
Krongold, Brian S., et al., "Computationally Efficient Optimal Power Allocation Algorithms for Multicarrier Communications Systems," IEEE Trans. On Communications, vol. 48, Jan. 2000, pp. 23-27.
Lampe, Lutz H.J., et al., "Performance Evaluation of Non-Coherent Transmission Over Power Lines," 2007, 8 pages.
Lashkarian, Navid, et al., Fast Algorithm for Finite-Length MMSE Equalizers with Application to Discrete Multitone Systems, IEEE, 1999, pp. 2753-2756.
Leke, Achankeng et al., "A Maximum Rate Loading Algorithm for Discrete Multitone Modulation Systems," IEEE, 1997, pp. 1514-1518.
Magesacher, Thomas et al., "Adaptive Interference Cancellation Using Common-Mode Information in DSL," Proceedings of European Signal Processing Conference 2005, Sep. 2005.
Magesacher, Thomas et al., "Analysis of Adaptive Interference Cancellation Using Common-Mode Information in Wireline Communications," EURSASIO Journal on Advances in Signal Processing, vol. 2007, Article 84956, Jun. 2007.
Magesacher, Thomas et al., "Information Rate Bounds in Commoon-Mode Aided Wireline Communications," European Transactions on Telecommunications, vol. 17, No. 5, Oct. 2006, pp. 533-545.
Melsa, Peter J.W., et al., "Impulse Response Shortening for Discrete Multitone Transceivers," IEEE vol. 44, No. 12, Dec. 1996, pp. 1662-1672.
Milosevic et al., "Simultaneous Multichannel Time Domain Equalizer Design Based on the Maximum Composite Shortening SNR," Dept. of Electrical and Compter Eng., The University of Texas, Austin, Texas, 2002, 5 pages.
Misao, Fukuda et all, "A Line Terminating LSI Using Echo Cancelling Method for ISDN Subscriber Loop Transmission," IEEE Journal on Selected Areas in Communications, vol. 6, No. 3, Apr. 1988, pp. 476-483.
Okamura, Yasuka et al., "ADSL System for Time Periodic Noise Environments," XP-00086790, NEC Res. & Develop., vol. 40, No. 1, Jan. 1999, pp. 64-69.
PCT Search Report, International Application No. PCT/US05/23634, International filing date Jun. 30, 2005, mailed May 4, 2006, 2 pages.
PCT Search Report, International Application No. PCT/US2005/036655, International filing date Oct. 11, 2005, mailed Feb. 14, 2006, 2 pages.
PCT Search Report, International Application No. PCT/US06/10004, International Filing Date Mar. 16, 2006, mailed Oct. 10, 2007, 1 page.
PCT Search Report, International Application No. PCT/US06/09687, International Filing Date Mar. 16, 2006, mailed Nov. 16, 2007, 1 page.
PCT Search Report, International Application No. PCT/US06/09804, Filing Date Mar. 17, 2006, mailed Apr. 2, 2008, 2 pages.
PCT Search Report, International Application No. PCT/US09/58821, Filing Date Sep. 29, 2009, Mailed Dec. 2, 2009, 2 pages.
PCT Written Opinion of the International Searching Authority, International Application No. PCT/US06/10004, International Filing Date Mar. 16, 2006, Mailed Oct. 10, 2007, 5 pages.

PCT Written Opinion of the International Searching Authority, International Application No. PCT/US06/09687, International Filing Date Mar. 16, 2006, Mailed Nov. 16, 2007, 5 pages.
PCT Written Opinion of the International Searching Authority, International Application No. PCT/US06/09804, Filing Date Mar. 17, 2006, Mailed Apr. 2, 2008, 6 pages.
PCT Written Opinion of the International Searching Authority, International Application No. PCT/US09/58821, Filing Date Sep. 29, 2009, Mailed Dec. 2, 2009, 7 pages.
Perez-Alvarez, Ivan A., et al., "A Differential Error Reference Adaptive Echo Canceller for Multilevel PAM Line Codes," Work supported by National Project T1C95-0026, IEEE, © 1996, pp. 1707-1710.
Sedarat, Hossein, et al., "Impulse Noise Protection for Multi-Carrier Communication Systems," submitted to IEEE ICASSP, 2005, 4 pages.
Sedarat, Hossein, et al., "Multicarrier Bit-Loading in Presence of Biased Gaussian Noise Sources," IEEE Consumer Communication and Networking Conference, Jan. 2005, 5 pages.
Sonalkar, Ranjan, et al., "An Efficient Bit-Loading Algorithm for DMT Application," IEEE Comm. Letters, vol. 4, Mar. 2000, pp. 80-82.
Sonalkar, Ranjan, et al., "Shannon Capacity of Frequency-Overlapped Digital Subscriber Loop Channels," IEEE, pp. 1741-1745, © 2002.
STLC60134S: TOSCA Integrated ADSL. CMOS Analog Front-End Circuit, Aug. 1999, 22 pages.
Wu, Cheng-Shing, et al., "A Novel Cost-Effective Multi-Path Adaptive Interpolated FIR (IFIR)-Based Echo Canceller," IEEE, © 2000, pp. V-453 - V-456.
Wyglinski, Alexander M., et al., "An Efficient Bit Allocation for Multicarrier Modulation," IEEE Wireless Communiation, Networking Conference, Atlanta, GA, Mar. 2004, 6 pages.
Non-Final Office Action dated Oct. 30, 2007, U.S. Appl. No. 11/067,434, filed Feb. 25, 2005, Sedarat, 11 pages.
Final Office Action dated Apr. 29, 2008, U.S. Appl. No. 11/067,434, filed Feb. 25, 2005, Sedarat, 13 pages.
Non-Final Office Action dated Jul. 21, 2008, U.S. Appl. No. 11/067,434, filed Feb. 25, 2005, Sedarat, 9 pages.
Non-Final Office Action dated Jan. 6, 2009, U.S. Appl. No. 11/067,434, filed Feb. 25, 2005, Sedarat, 17 pages.
Non-Final Office Action dated Aug. 19, 2009, U.S. Appl. No. 11/067,434, filed Feb. 25, 2005, Sedarat, 11 pages.
Non-Final Office Action dated May 16, 2008, U.S. Appl. No. 11/131,392, filed May 16, 2008, Wiese, 10 pages.
Non-Final Office Action dated Dec. 10, 2008, U.S. Appl. No. 11/131,392, filed May 16, 2005, Wiese, 18 pages.
Non-Final Office Action dated Jun. 9, 2009, U.S. Appl. No. 11/131,392, filed May 16, 2005, Wiese, 17 pages.
Non-Final Office Action dated Aug. 21, 2008, U.S. Appl. No. 11/248,704, filed Oct. 11, 2005, Norrell et al., 13 pages.
Non-Final Office Action dated Feb. 4, 2009, U.S. Appl. No. 11/248,704, filed Oct. 11, 2005, Norrell et al., 16 pages.
Final Office Action dated Aug. 5, 2009, U.S. Appl. No. 11/248,704, filed Oct. 11, 2005, Norrell et al., 19 pages.
Non-Final Office Action dated Feb. 24, 2009, U.S. Appl. No. 11/377,114, filed Mar. 15, 2006, Sedarat, 10 pages.
Final Office Action dated Jul. 31, 2009, U.S. Appl. No. 11/377,114, filed Mar. 15, 2006, Sedarat, 13 pages.
Non-Final Office Action dated Nov. 9, 2007, U.S. Appl. No. 11/377/083, filed Mar. 15, 2006, Sedarat, 11 pages.
Non-Final Office Action dated May 19,2008, U.S. Appl. No. 11/377/083, filed Mar. 15, 2006, Sedarat, 14 pages.
Notice of Allowance dated May 18, 2009, U.S. Appl. No. 11/377/083, filed Mar. 15, 2006, Sedarat, 7 pages.
Final Office Action dated Dec. 4, 2008, U.S. Appl. No. 11/377/083, filed Mar. 15, 2006, Sedarat, 10 pages.
Non-Final Office Action dated Dec. 11, 2008, U.S. Appl. No. 11/377,084, filed Mar. 15, 2006, Sedarat et al., 10 pages.
Non-Final Office Action dated Aug. 4, 2009, U.S. Appl. No. 11/377,084, filed Mar. 15, 2006, Sedarat et al., 12 pages.

* cited by examiner

VARIOUS METHODS AND APPARATUSES FOR IMPULSE NOISE DETECTION

TECHNICAL FIELD

Embodiments of the invention generally pertain to the field of communication systems and, more particularly, to impulse noise detection in multi-carrier communication systems.

BACKGROUND

There are various types of interference and noise sources in a multi-carrier communication system, such as a Discrete Multiple-Tone (DMT) system. Interference and noise may corrupt the data-bearing signal on a tone as the signal travels through the communication channel and is decoded at the receiver. The transmitted data-bearing signal may be decoded erroneously by the receiver because of this signal corruption. The number of data bits or the amount of information that a tone carries may vary from tone to tone and depends on the relative power of the data-bearing signal compared to the power of the corrupting signal on that particular tone.

In order to account for potential interference on the transmission line and to guarantee a reliable communication between the transmitter and receiver, each tone of a DMT system is typically designed to carry a limited number of data bits per unit time based on the tone's Signal to Noise Ratio (SNR) using a bit-loading algorithm, which is an algorithm to determine the number of bits per tone. The number of bits that a specific tone may carry decreases as the relative strength of the corrupting signal increases, that is when the SNR is low. Thus, the SNR of a tone may be used to determine how much data should be transmitted by the tone to achieve a target bit error rate.

It is often assumed that the corrupting signal is an additive random source with Gaussian distribution and white spectrum. With this assumption, the number of data bits that each tone can carry relates directly to the SNR. However, this assumption may not be true in many practical cases where there might exist various sources of interference that do not have a white, Gaussian distribution. Impulse noise is one such noise source. Bit-loading algorithms are usually designed based on the assumption of additive, white, Gaussian noise. With such algorithms, the effects of impulse noise can be underestimated, resulting in aggressive bit loading and, consequently, an excessive rate of error.

Further, channel estimation procedures that can be designed to optimize performance in the presence of stationary impairments such as additive, white, Gaussian noise, but are often poor at estimating non-stationary or cyclo-stationary impairments, such as impulse noise. Consequently, Digital Subscriber Line (DSL) modem training procedures are typically well suited to optimizing performance in the presence of additive, white, Gaussian noise, but leave the modem receivers relatively defenseless to impulse noise.

Impulse Noise can be a difficult impairment for DSL modems. Impulse noise with duration of tens of microseconds can cause errors in all the used tones at the receiver. Further, impulse noise can have power bursts that are much higher than the background noise level causing significant performance loss. These power bursts can have a very small duty cycle, such that they do not contribute significantly to average noise power. This can result in aggressive bit loading on some or all tones in a DMT system, resulting in an excessively high bit error rate. It is thus desirable to detect the presence of and mitigate the impact of impulse noise in Asymmetric DSL (ADSL) and Very high bit-rate DSL (VDSL) and other communications systems.

SUMMARY

Methods and apparatuses for detecting impulse noise in a DSL communication system are described.

According to certain embodiments, the method applies to systems where a coding scheme such as Trellis Coded modulation is employed at the transmitter. The receiver decodes the received data sequence using a hard decision decoder as well as a soft decision decoder. The results of these two decoders are compared. The presence of impulse noise is detected based on a lack of agreement between the hard decision output and the soft decision output.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DISCUSSION

In general, methods and apparatuses for detecting presence of impulse noise in a communication system are discussed. According to certain embodiments, the method includes comparing a hard decision output of a decoder with a soft decision output for a convolution coded modulation symbol received at a digital subscriber line (DSL) receiver. The presence of impulse noise is detected based on a lack of agreement between the hard decision output and the soft decision output.

According to certain embodiments of the invention, an impulse noise detection method includes utilizing already existing coding in the communication system. Many modern variants of Digital Subscriber Line (DSL) systems, such as ADSL and VDSL, use codes, such as convolution codes, to improve performance. Convolution codes, such as trellis codes, are typically used to encode digital data before transmission through noisy or error-prone channels. Further, according to certain embodiments of the invention, a DSL modem takes advantage of certain properties of coded modulation, such as Trellis Coded Modulation (TCM), to determine where symbol errors due to impulse noise are most likely to have occurred. This information can be used to determine the presence of impulse noise.

TCM is a modulation scheme that allows for efficient transmission of information used by many modern ADSL/VDSL systems over bandwidth-limited channels such as telephone lines. A typical TCM scheme involves the mapping of an encoder output directly to a point on a signal constellation, such as an 8-QAM constellation. The combination of the encoding and mapping elements is jointly optimized so as to obtain good error performance. For example, an encoder could take two bits as input and have a three-bit output that is mapped to an 8-QAM constellation. In such a case, the encoder would be said to encode at a ⅔ rate, that is, two inputs bits produce three encoded output bits. When the trellis coded signal is received and decoded by the system receiver, each branch of the trellis corresponds to one 8-QAM symbol, which facilitates soft decision decoding.

Figure 1:
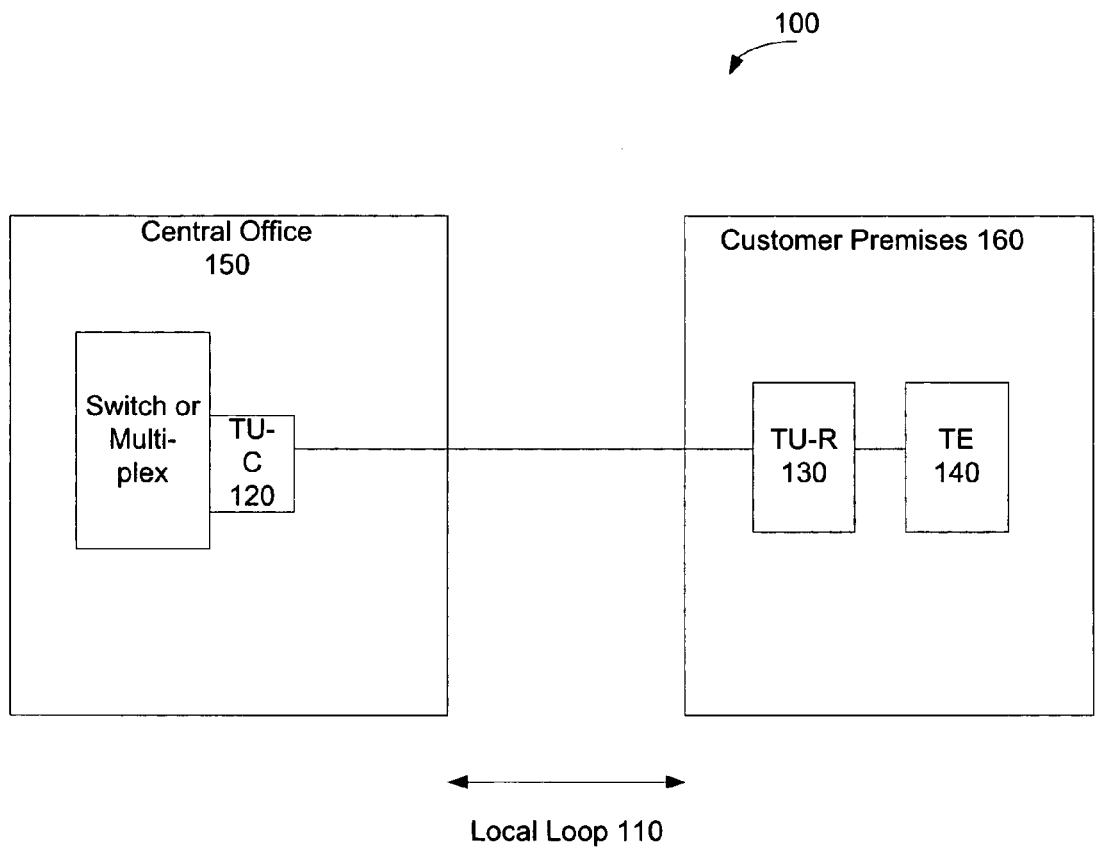
FIG. 1 illustrates a schematic diagram of an embodiment of a DSL system.

FIG. 1 shows a DSL system 100. The DSL system 100 consists of a local loop 110 (telephone line) with a transceiver (also known as a modem) at each end of the wires. The transceiver at the network end of the line 150 is called transmission unit at the central end (TU-C) 120. The TU-C 120 may reside within a DSL access multiplexer (DSLAM) or a digital loop carrier remote terminal (DLC-RT) for lines fed from a remote site. The transceiver at the customer end 160 of the line is called transmission unit at the remote end (TU-R) 130. FIG. 1 also shows the terminal equipment 140, which is the end-user equipment, such as a personal computer or a telephone.

A DSL system 100 (e.g., ADSL or VDSL) may use a multi-tone system for transmission of information from a transmitter to a receiver over a number of tones. An example of a multi-tone communication system is a Discrete Multiple-Tone (DMT) system.

DMT communication systems use a modulation method in which the available bandwidth of a communication channel, such as twisted-pair copper media, is divided into these numerous tones. The term communication channel is understood to refer generally to a physical transmission medium, including copper, optical fiber, and so forth, as well as other transmission mediums, including radio frequency (RF) and other physical or non-physical communication signal paths.

Figure 2:
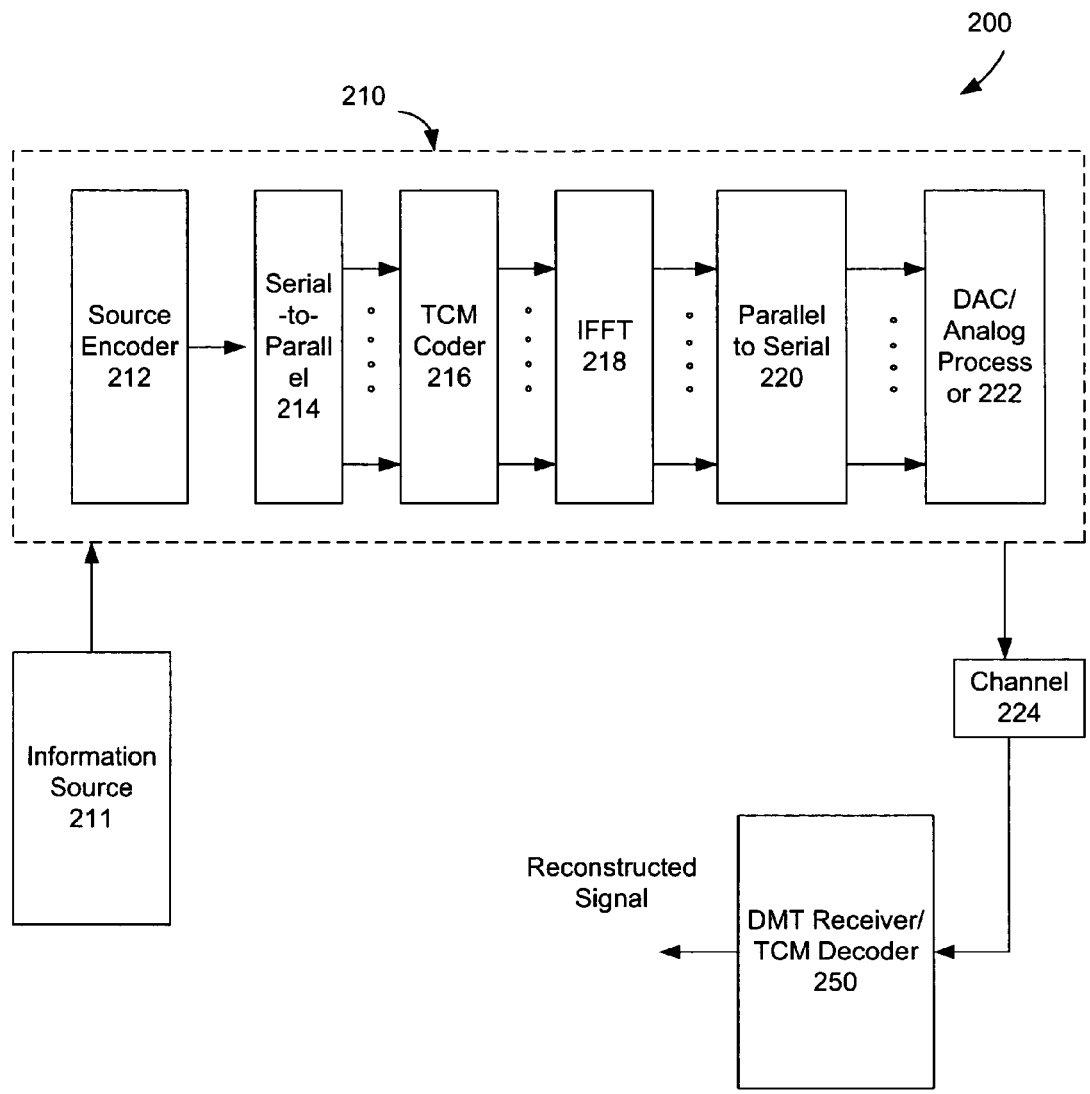
FIG. 2 illustrates a schematic diagram of a digital communication system in which an embodiment of the invention can be implemented.

FIG. 2 illustrates a block diagram of an embodiment of a Discrete Multi-Tone (DMT) communication system 200 that uses TCM. The DMT communication system 200 carries information from the transmitter 210 through a communication channel 224 (such as a telephone line) to a receiver 250, such as a DSL modem, with a number of sub-carriers i.e. tones. An Information Source 211 is connected to the Transmitter 210, which may include a Source Encoder 212, a Serial-to-Parallel Converter 214, a QAM/TCM Encoder 216, an Inverse Fourier Transform (IFFT) 218, a Parallel-to-Serial Converter 220, and a Digital-to-Analog Converter (DAC) followed by Analog Processing 222. The Information Source 211 provides the source data stream that is to be ultimately conveyed to the receiver 250. This source data is assumed to be in a digitized format and is passed to the Source Encoder 212. The source encoder 212 removes redundancy or randomizes the source data stream, producing an information sequence that has been optimized for maximum information content. The information sequence from the Source Encoder 212 is passed to the QAM/TCM Encoder 216.

The QAM/TCM Encoder 216 is designed so as to introduce an element of redundancy into the information sequence that is supplied by the Source Encoder 212 to generate a coded output. While initially appearing at odds with the function of the Source Encoder 212, in reality the redundancy added by the QAM/TCM Encoder 216 serves to enhance the error correction capability of the communication system. By introducing redundant information into the information sequence in a controlled manner, a receiver having knowledge of the codes used can decode without error data sequences that would be decoded with a high rate of error if the receiver were unable to make use of the redundant information. The particular QAM/TCM Encoder 216 produces "n+1" output bits for each "n" input bits. These output bits are mapped to constellation points differently than in an un-coded DMT system.

More generally, for TCM encoding, given $K_i$ bits to encode for P-dimensional (e.g., 2D, 4D, etc.) symbol i, N bits are reserved for coset selection, and ($K_i$ minus N) bits are used to select a point within the chosen coset. The P-dimensional constellations are divided into $2^N$ sub-constellations called cosets. These cosets have much greater intra-coset distance than the original constellation. There will be N encoder output bits dedicated to selection of the coset, and these bits are the ones that are directly involved with the encoder state machine.

A point within the chosen coset is selected using the remaining ($K_i$ minus P) bits left over from the first stage encoding process. The coset selection bits have two distinct properties that the other ($K_i$ minus P) bits do not have: there is correlation from symbol to symbol created by the encoder state machine memory, and there is redundant information in these four bits also generated by the state machine. The transmitter output can be thought of as a sequence of cosets, this sequence constrained by the encoder such that not all possible sequences of cosets are allowed.

Considering an ADSL modem as an example, a trellis code may be used for coding. An example of a trellis code that may be used in an ADSL modem is a 16 state, 4 dimensional Wei code. This means that the DMT frame is organized such that carriers are encoded as pairs. Accordingly, there are 2 dimensions each for 2 carriers, yielding 4 dimensions total per symbol. A symbol is a unique signal state of a modulation scheme used on a transmission link that conveys one or more information bits to the receiver.

The encoder outputs a sequence of bits to a Constellation Mapper contained within the QAM/TCM Encoder 216. This Constellation Mapper converts a number represented by a group of bits to a point in 4-dimensional space. In a 4-dimensional scheme, such as that used for many DSL modems, the Constellation Mapper actually maps two groups of bits into 2, 2-dimensional points. Taken together, these two points are treated as a single 4-dimensional point. The set of all possible points is known as a "Constellation". Typical signal constellations used in digital communications system modulation include 16 QAM, 8-PSK, 4-PSK and the like.

The Analog Processor 218 interfaces the combination QAM/TCM Encoder 216 and IFFT 218 to the communications channel 224, such as telephone wires. The Analog Processor 218 performs modulation to generate waveforms that both suit the physical nature of the channel 224 and can be efficiently transmitted over the channel 224. These output waveforms are generally selected with regard to either simplification of the communication system, detection performance, power requirements, or bandwidth availability.

The DMT Receiver 250 of the digital communications system 200 processes the received waveform (which may be corrupted by impulse noise during transmission) for any given symbol to determine which of the possible points in the signal constellation was transmitted. When the transmitted sequence includes redundancy introduced by channel coding, the DMT Receiver 250 invokes a TCM Decoder 250 that attempts to reconstruct the original information sequence from its a priori knowledge of the code used by the TCM coder 216.

Figure 3:
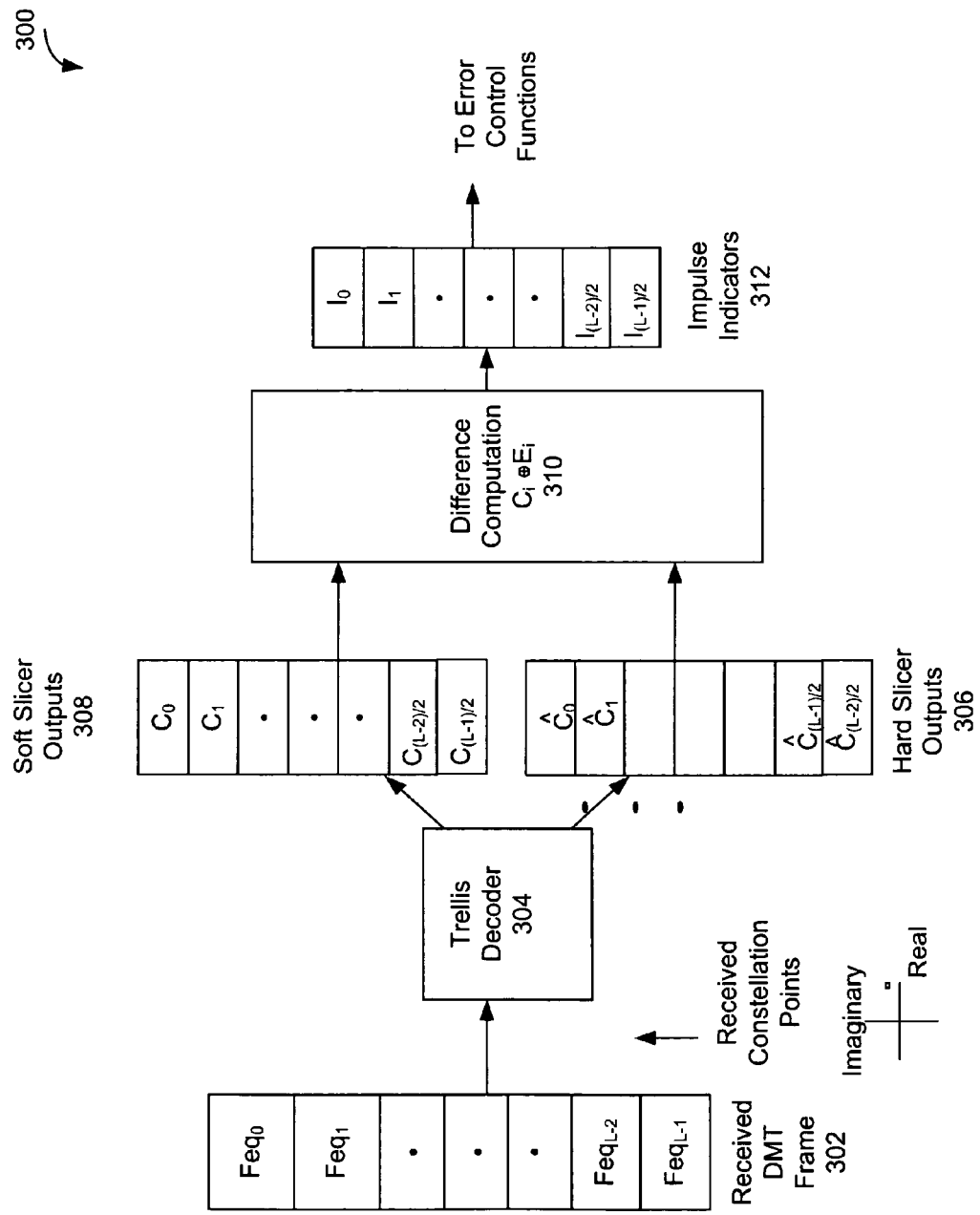
FIG. 3 illustrates a schematic diagram of impulse noise mitigation system, according to an embodiment of the invention.

FIG. 3 illustrates a block diagram of a communication system 300 with impulse noise detection capabilities, according to certain embodiments of the invention. As shown in FIG.

3, for each received DMT frame, Frequency Domain Equalizer (FEQ) outputs 302 are fed to a Trellis Decoder 304, such as a Viterbi decoder. These FEQ outputs are presented to the decoder as points in 2D space.

At a first stage of decoding the Trellis Decoder 304 may use the Viterbi algorithm to decide which one of $2^N$, P-Dimensional Cosets were sent. For instance, for a 4-Dimensional trellis code, the Trellis Decoder 304 may decide which one of eight, 4-Dimensional (4D) Cosets were sent. Specifically, the Trellis Decoder 304 may determine the distance from the received 4D point to the nearest point within each of the 8 cosets. This yields 8 coset decisions 306 with 8 distances. The best (smallest distance) coset from the eight is selected and recorded. This result is equivalent to the best slicer output produced by the hard decision slicer in an uncoded system.

At a second stage of decoding, the Trellis decoder 304 uses the hard slicer output data in conjunction with knowledge of the code (allowed coset sequences) to determine which of the allowed sequences of cosets is the best match to the received sequence. The results are called Soft Decisions 308.

The best coset choice from the first stage process is compared to the corresponding coset choice in the best sequence selected by the second stage decoder. As shown in FIG. 3, the comparison can be done by performing a difference computation 310. If these choices disagree, the decision for this 4D symbol may be flagged as an unreliable decision. For instance, an indicator corresponding to the 4D tone within the DMT frame where the disagreement occurs can be set. The indicator may be a 1 indicating a lack of agreement between the hard decision and the soft decision, or a 0 indicating agreement between the hard decision and the soft decision. According to certain embodiments of the invention, the indicators can be stored in an indicator table 312. The indicators can be observed for each frame over several frames. For each frame, the indicator can be compared to a threshold to determine the presence of impulse noise.

Figure 4:
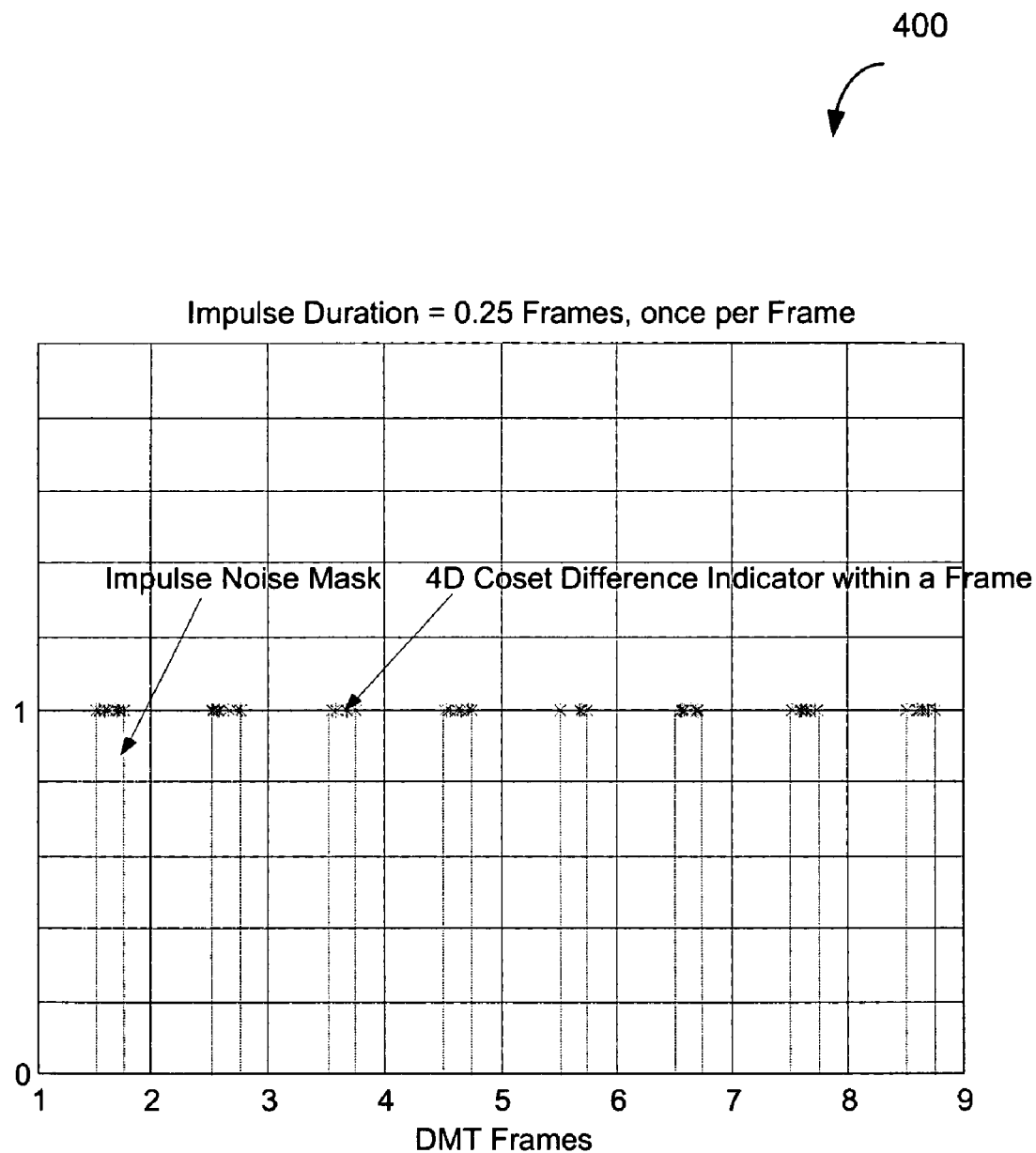
FIG. 4 illustrates a graph of an embodiment of using impulse noise detection indicators to detect noise within DMT frames.

The indicators can also be used to detect presence of narrow band impulse noise having a noise bandwidth that is narrower than the DMT system bandwidth. The indicators can be looked at on a 4D symbol basis and associated with specific tones. If the indicators show errors consistently for some tones and not others, then the prediction can be made that narrow band interference is present. FIG. 4 shows an example of impulse noise detection indicators being used to detect impulse noise even when noise bandwidth is narrower than the DMT system bandwidth. The impulse noise hits approximately 25% of the DMT bandwidth each frame. In FIG. 4, the hard decisions-soft decisions P-dimensional (e.g., 4D) difference indicator is plotted along with the impulse noise mask.

According to certain embodiments, parameters of the impulse noise, such as the periodicity and tone location information of the impulse noise, can be sent to the DSL transmitter, so that it can reduce or eliminate data payload in frames and tones where the impulse noise is detected. This reduces or eliminates the need for retransmission of corrupted data.

The example shown in FIG. 3 uses a 4-D trellis code. The same approach can work with trellis codes of different dimensionality, such as 2, 4, 6, 8, etc.

The frequency with which a given symbol is "rescued" by the trellis decoder can be used in locating unreliable symbols. The impulse noise detection system 300 can be used to identify DMT frames that are suspected to have been corrupted by impulse noise. Further, the impulse noise detection system 300 can also be used to pinpoint specific carriers within a frame that are likely to be plagued by decoder errors. Additionally, information from this error location technique can be used to locate troublesome carriers in DMT systems that are operating at excessively high error rates. These carriers can then be optimized via one of several on-line procedures such as Dynamic Rate Adaptation or Bit Swapping to reduce error rates to acceptable levels.

Impulse noise detection methods discussed herein can also be very beneficial for flagging erasures to improve the performance of a Reed Solomon (RS) decoder in the modem receiver. For instance, an erasure indicator for systems employing erasure decoding can be implemented. Erasure decoding is a scheme that is sometimes used to extend the error correction capability of RS decoding. For instance, for a RS codeword consisting of 255 bytes total, and K redundant bytes, the decoder is capable of correcting up to K/2 errored bytes distributed randomly in the 255-byte RS codeword. However, if there is some means of identifying the errored bytes to the decoder, then the decoder is capable of correcting up to K known errored bytes. An errored byte is one that contains one or more bit errors. Impulse noise detection methods discussed herein can be used to help locate errored bytes, thus improving the performance of the RS decoder.

Figure 5:
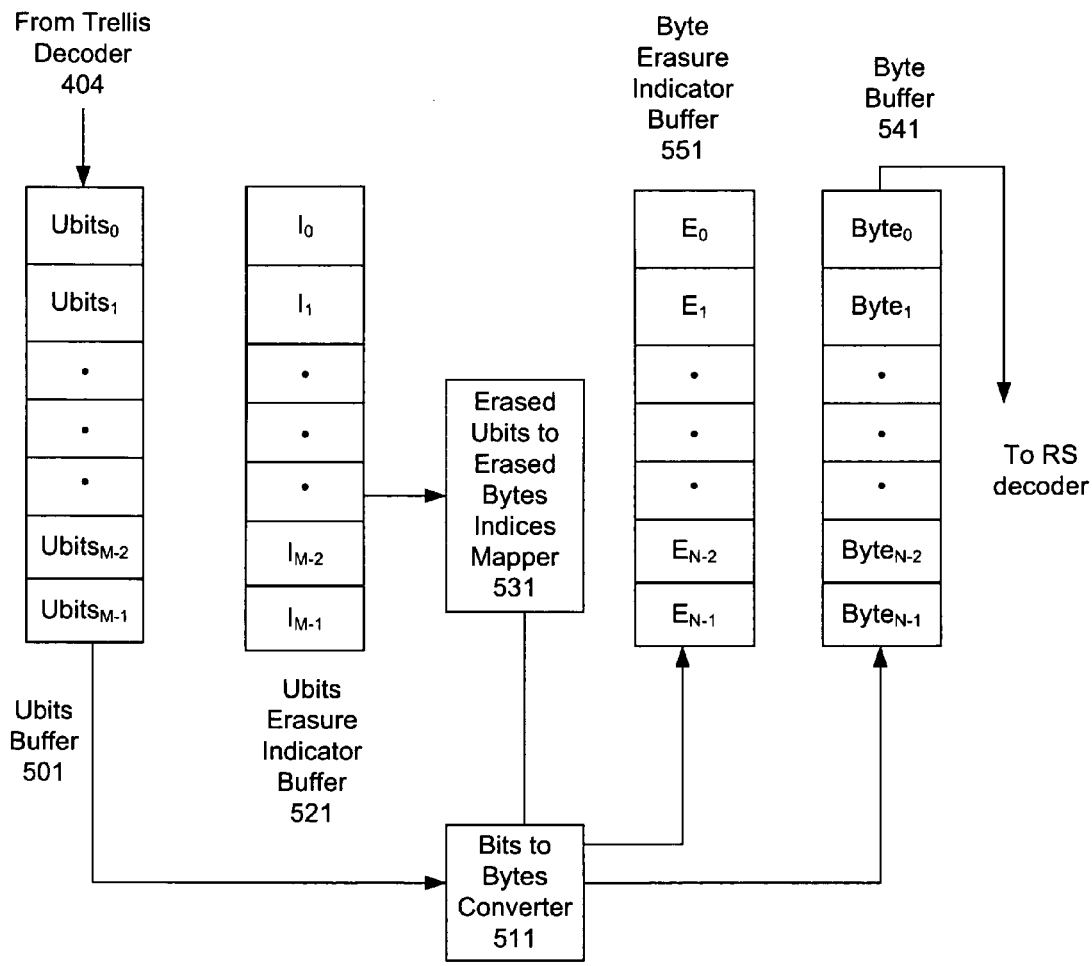
FIG. 5 illustrates a schematic diagram showing an embodiment of a receiver using an erasure indicator.

An exemplary implementation is illustrated in FIG. 5. The output of the Trellis Decoder is a group of bits called Ubits, which correspond to each 4D tone pair in the DMT frame. The Ubits are information bits as opposed to redundant bits that are used by a trellis decoder to do its decoding. The Ubits are buffered in a Ubits buffer 501 and grouped into bytes by a Bits to Bytes Formatter 511. The bytes are stored in a byte buffer 541 for use in the Reed-Solomon (RS) decoder. The Impulse Noise Detector 300 marks the Ubits as erased or not. This information is stored in a Ubits Erasure Indicator Buffer 521. Since the number of Ubits per symbol is, in general, variable and not necessarily a multiple of 8, an algorithm 531 maps the erased Ubits locations to erased bytes locations. The mapped information is stored in a byte erasure indicator buffer 551.

Thus, methods and apparatus for detecting impulse noise in a multi-tone communication system by taking advantage of the basic properties of coded modulation have been described. The impulse noise detection methods described herein can perform as well as other techniques with much lower complexity, requiring only the addition of a hard decision process. Other techniques require the addition of considerable hardware and/or software because of the added computational burden. No knowledge of the constellation is required as it operates on the P-Dimensional cosets, which are already understood by the trellis decoder apparatus. Furthermore, the methods discussed herein are able to detect and distinguish the difference between narrow band and broadband noise, which can be useful in systems employing erasure decoding, because the number of erasures is reduced by not always erasing an entire DMT Frame, but rather just the symbols within the frame which are deemed unreliable by this method.

Thus, a method and apparatus for detecting impulse noise have been described. As part of the process of decoding in a coded system (such as a system employing trellis code), the decoder makes P-Dimensional coset hard decisions and soft decisions. The assumption may be made that if the system is operating with enough noise margin, the hard decisions and the soft decisions will disagree only once for every million symbols or so. When the actual noise increases beyond the allocated noise margin, as can happen in the presence of impulse noise, the soft decisions and hard decisions will tend to disagree more often. Hence, impulse noise can be detected by monitoring the difference between soft decisions and the hard decisions.

The detection and mitigation of the impulse noise may use various features of the ADSL, ADSL2, and VDSL specifications. Note that references throughout this specification to "one embodiment" or "an embodiment" or "certain embodiments" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

The detailed description above includes several modules. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software. In one embodiment, the software used to facilitate the impulse noise mitigation can be embodied onto a machine-readable storage medium. A machine-readable storage medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for impulse noise detection, comprising:
    processing a received signal using a first stage of a decoder arrangement to provide a hard decision output representing best estimates of transmitted data elements and a second stage of the decoder arrangement to provide a soft decision output based on the hard decision output, the soft decision output representing a determination of whether a grouping of the hard decision outputs represents an allowable sequence of data elements;
    comparing the hard decision output with the soft decision output; and
    detecting a presence of impulse noise based on a lack of agreement between the hard decision output and the soft decision output.

2. The method of claim 1, wherein the received signal comprises a trellis coded modulated signal.

3. The method of claim 1, further comprising:
    selecting the hard decision output from a set of hard decision outputs of the decoder arrangement based upon a distance between the hard decision output and a point received at the decoder arrangement.

4. The method of claim 1, further comprising:
    setting an indicator to indicate the lack of agreement between the hard decision output and the soft decision output; and
    comparing the indicator with a threshold to determine the presence of the impulse noise.

5. The method of claim 1, further comprising:
    instructing to reduce an amount of data transmitted with data frames in which the presence of the impulse noise is detected as compared to data frames with no impulse noise.

6. The method of claim 1, further comprising:
    setting an indicator to indicate the lack of agreement between the hard decision output and the soft decision output;
    comparing the indicator with a threshold to determine the presence of the impulse noise; and
    utilizing the indicator in an erasure indicator for DSL systems employing erasure decoding.

7. A method for impulse noise detection, comprising:
    comparing a hard decision output of a decoder with a soft decision output of the decoder for a convolution coded modulation symbol received at a digital subscriber line (DSL) receiver;
    detecting a presence of impulse noise based on a lack of agreement between the hard decision output and the soft decision output; and
    selecting the soft decision output from a set of soft decision outputs of the decoder based upon a match between the set of soft decision outputs and a received sequence.

8. A digital subscriber line (DSL) modem, comprising a receiver, the receiver comprising:
    a trellis decoder, having a soft decision output and a hard decision output, configured to decode which of a plurality of sub-constellations are received at the receiver, the hard decision output representing best estimates of transmitted data elements and the soft decision output being based on the hard decision and representing a determination of whether a grouping of the hard decision outputs represents an allowable sequence of data elements;
    a comparator configured to receive the soft decision output and the hard decision output, to compare soft decision data from the soft decision output and hard decision data from the hard decision output, and to generate a comparison result on an output of the comparator; and
    an impulse noise predictor to predict when data frames are affected by impulse noise based upon the comparison result.

9. The DSL modem of claim 8, wherein data frames are decoded into P-dimensional constellations having $2^N$ sub-constellations.

10. The DSL modem of claim 8, further comprising:
    a table configured and arranged to receive the output of the comparator and to set an indicator to indicate a lack of agreement between the hard decision data and the soft decision data.

11. The DSL modem of claim 8, wherein the comparator is further configured to select the hard decision data from a set of hard decision outputs based upon a distance between each of the set of hard decision outputs and a point received at the trellis decoder.

12. The DSL modem of claim 10, wherein the distance between the hard decision data that is selected and the point received at the trellis decoder is shorter than the distance between each of the set of hard decision outputs that was not selected and the point received at the trellis decoder.

13. The DSL modem of claim 8, wherein the comparator is further configured to select the soft decision data from a set of soft decision outputs based upon a match between the set of soft decision outputs and a received sequence of data.

14. The DSL modem of claim 8, wherein the trellis decoder is a viterbi decoder.

15. A DSL system, comprising:
a first transmitter-receiver device having a receiver, the receiver having an impulse noise predictor configured to determine if data frames are affected by impulse noise based on a comparison of soft decision data and hard decision data of a decoder arrangement at the receiver,
the receiver being configured to process a received signal using a first stage of the decoder arrangement to provide a hard decision output representing best estimates of transmitted data elements and a second stage of the decoder arrangement to provide a soft decision output based on the hard decision output, the soft decision output representing a determination of whether a grouping of the best estimates represents an allowable sequence of data elements,
the receiver being configured to compare the hard decision output with the soft decision output, and
the receiver being configured to detect a presence of impulse noise based on a lack of agreement between the hard decision output and the soft decision output; and
a second transmitter-receiver device having a transmitter, the first transmitter-receiver device being configured and arranged to transmit parameters of the impulse noise to the second transmitter-receiver device.

16. The DSL system of claim 15, wherein the second transmitter-receiver device is configured to reduce payload data in frames upon receiving the control parameters from the first transmitter-receiver device.

17. A method for impulse noise detection, comprising:
comparing a hard decision output of a decoder with a soft decision output of the decoder for a convolution coded modulation symbol received at a digital subscriber line (DSL) receiver; and
detecting a presence of impulse noise based on a lack of agreement between the hard decision output and the soft decision output, wherein the hard decision output is a nearest-neighbor decision output corresponding to a sub-constellation point nearest to a current point received at the decoder, and wherein the soft decision output is a coding-assisted decision output corresponding to an allowed sequence of points best matched to a sequence of points received at the decoder.

18. A digital subscriber line (DSL) modem, comprising a receiver, the receiver comprising:
a trellis decoder, having a soft decision output and a hard decision output, configured to decode which of a plurality of sub-constellations are received at the receiver;
a comparator, coupled to the soft decision output and the hard decision output, configured to compare a soft decision data from the soft decision output and the hard decision data from the hard decision output for a convolution coded modulation symbol received at the receiver and to generate a comparison result on an output of the comparator; and
an impulse noise predictor to predict when data frames are affected by impulse noise based upon the comparison result,
wherein the hard decision output is a nearest-neighbor decision output corresponding to a sub-constellation point of the plurality of sub-constellations nearest to a current point received at the trellis decoder, and wherein the soft decision output is a coding-assisted decision output corresponding to an allowed sequence of points best matched to a sequence of points received at the trellis decoder.

* * * * *